US010013244B2

(12) United States Patent
Arakawa

(10) Patent No.: US 10,013,244 B2
(45) Date of Patent: Jul. 3, 2018

(54) APPARATUS AND METHOD TO COMPILE A VARIADIC TEMPLATE FUNCTION

(71) Applicant: FUJITSU LIMITED, Kawasaki-shi, Kanagawa (JP)

(72) Inventor: Masahiro Arakawa, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/485,852

(22) Filed: Apr. 12, 2017

(65) Prior Publication Data

US 2017/0329585 A1 Nov. 16, 2017

(30) Foreign Application Priority Data

May 12, 2016 (JP) .................................. 2016-096559

(51) Int. Cl.
*G06F 9/44* (2018.01)
*G06F 8/41* (2018.01)

(52) U.S. Cl.
CPC .................................. *G06F 8/447* (2013.01)

(58) Field of Classification Search
None
See application file for complete search history.

(56) References Cited

U.S. PATENT DOCUMENTS 8,645,248 B2 * 2/2014 Roselli .................. G06Q 10/10
705/35
2005/0097530 A1 5/2005 Asao et al.

FOREIGN PATENT DOCUMENTS

JP 2002-140198 5/2002
JP 2005-141380 6/2005

* cited by examiner

*Primary Examiner* — Chuck Kendall
(74) *Attorney, Agent, or Firm* — Staas & Halsey LLP

(57) ABSTRACT

An apparatus duplicates a process code of a variadic template function that has a variable number of parameters in a source code, in association with each of actual arguments in an actual-argument list corresponding to a variadic parameter defined by a variadic operator that packs the variable number of parameters of the variadic template function. The apparatus substitutes another parameter in each duplicated process code with a prepared parameter that accepts the actual argument associated with the each duplicated process code. The apparatus firstly inserts, into a recursive call part in a process code of the variadic template function, a first duplicated process code that is associated with an actual argument at a head of the actual-argument list, and repeats inserting, into a recursive call part in the previously inserted duplicated process code, a next duplicated process code associated with a subsequent actual argument.

6 Claims, 15 Drawing Sheets

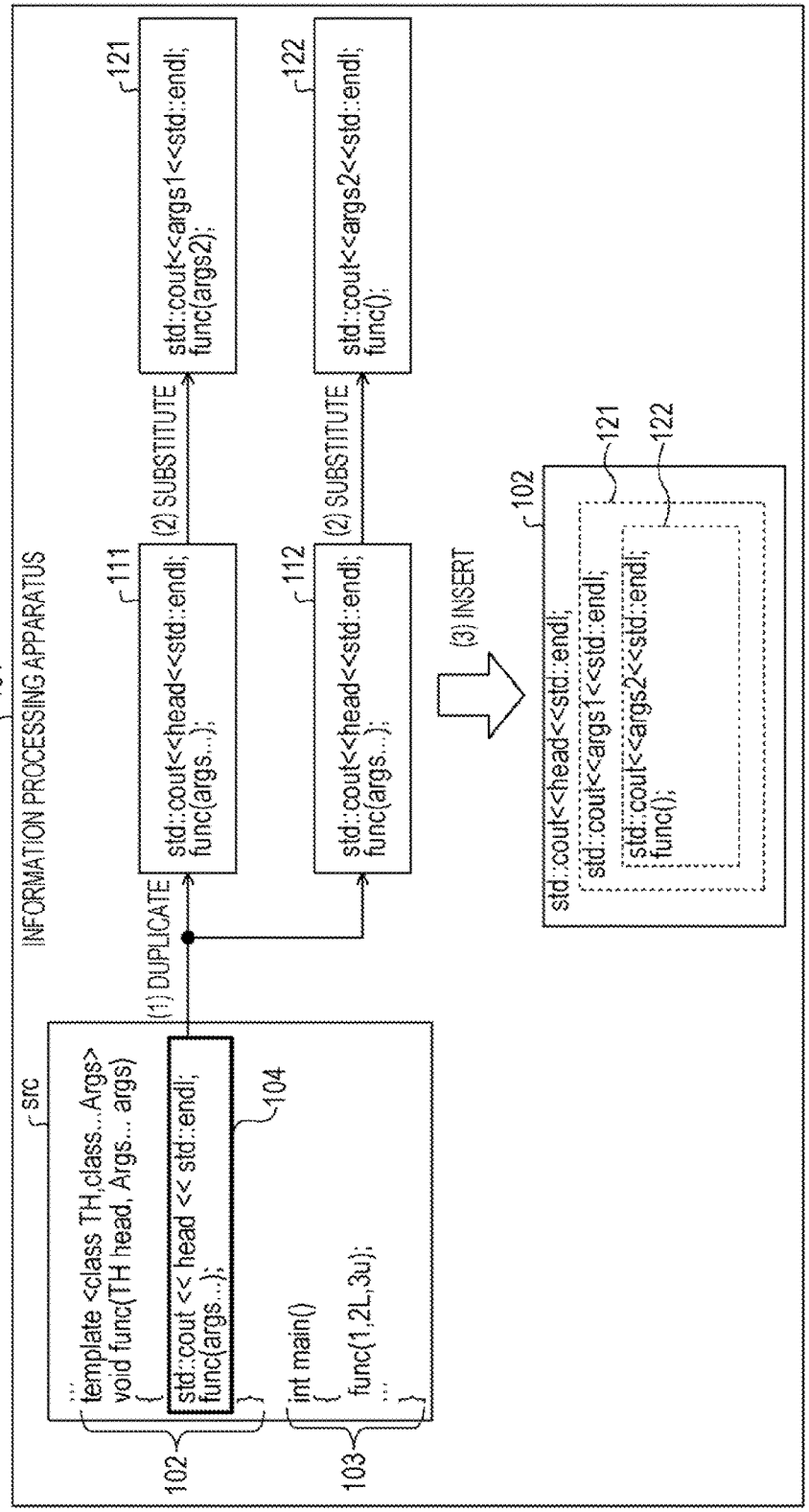

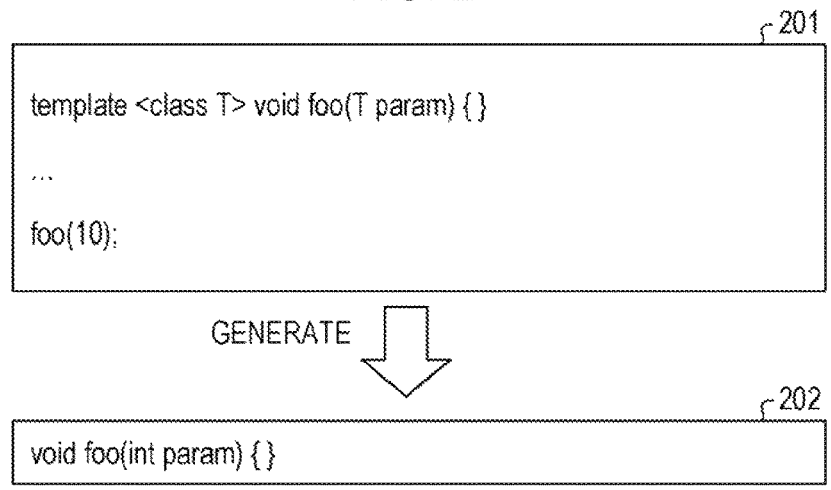
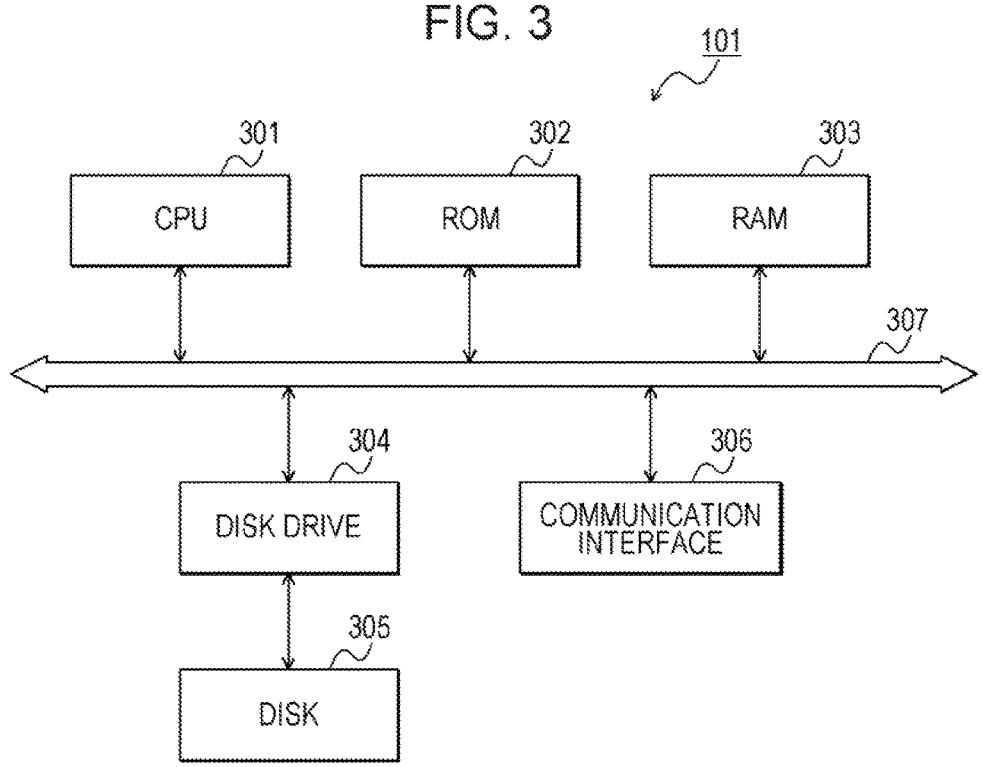

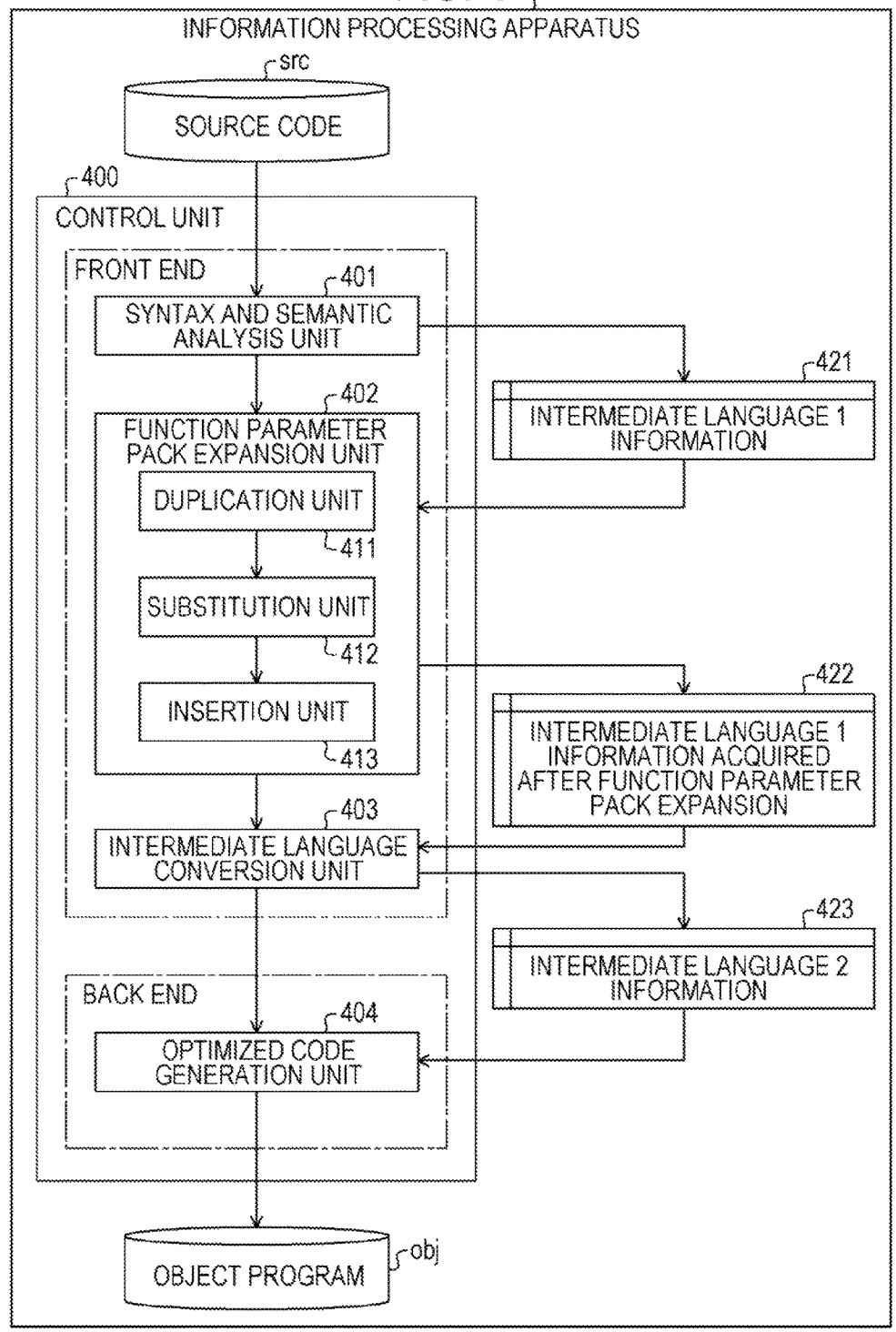

FIG. 5

```
include <iostream> void func() { std::cout << "end" << std::endl; } template <class TH, class... Args>   //TEMPLATE PARAMETER PACK
void func(TH head, Args... args)     //FUNCTION PARAMETER PACK
{
    std::cout << head << std::endl;
    func(args...);                   //REFER TO FUNCTION PARAMETER PACK
} int main()
{
    func(1, 2L, 3u, 4.0F, 5.0);      //PASS ARGUMENT TO FUNCTION PARAMETER PACK
    return 0;
}
```

501, 511, 512, 502, 503, src

FIG. 6

```
501 →  void func() { std::cout << "end"<< std::endl; }

//GENERATED FROM CALL OF CODE 511 "func(1, 2L, 3u, 4.0F, 5.0);"
       void func(int head, long args1, unsigned int args2, float args3,
                 double args4)
601 {  {
   611 →   std::cout << head << std::endl;
          func(args1, args2, args3, args4);   //REFER TO FUNCTION PARAMETER PACK
       }

//GENERATED FROM CALL OF CODE 611 "func(args1, args2, args3, args4);"
       void func(long head, unsigned int args1, float args2, double args3)
602 {  {
   612 →   std::cout << head << std::endl;
          func(args1, args2, args3);          //REFER TO FUNCTION PARAMETER PACK
       }

//GENERATED FROM CALL OF CODE 612 "func(args1, args2, args3);"
       void func(unsigned int head, float args1, double args2)
603 {  {
   613 →   std::cout << head << std::endl;
          func(args1, args2);                 //REFER TO FUNCTION PARAMETER PACK
       }

//GENERATED FROM CALL OF CODE 613 "func(args1, args2);"
       void func(float head, double args1)
604 {  {
   614 →   std::cout << head << std::endl;
          func(args1);                        //REFER TO FUNCTION PARAMETER PACK
       }

//GENERATED FROM CALL OF CODE 614 "func(args1);"
       void func(double head)
605 {  {
   615 →   std::cout << head << std::endl;
          func();                             //REFER TO FUNCTION PARAMETER PACK
       }
```

FIG. 10

```
std::cout << head << std::endl;                                    ~900
  std::cout << args1 << std::endl;        // head <= args1         ~911
    std::cout << args2 << std::endl;      // head <= args2         ~912
      std::cout << args3 << std::endl;    // head <= args3         ~913
        std::cout << args4 << std::endl;  // head <= args4         ~914
        func();
```

SUBSTITUTE func()
WITH ACTUAL CODE

↓

```
std::cout << head << std::endl;                                    ~900
  std::cout << args1 << std::endl;        // head <= args1         ~911
    std::cout << args2 << std::endl;      // head <= args2         ~912
      std::cout << args3 << std::endl;    // head <= args3         ~913
        std::cout << args4 << std::endl;  // head <= args4         ~914
        std::cout << "end" << std::endl;
```

FIG. 12

INTERMEDIATE LANGUAGE 1 INFORMATION ACQUIRED AFTER FUNCTION PARAMETER PACK EXPANSION ⌐422

FUNCTION func INFORMATION ⌐1201

PARAMETER INFORMATION ⌐1211

FIRST ARGUMENT: head
　　TYPE: int

SECOND ARGUMENT: args1
　　TYPE: long

THIRD ARGUMENT: args2
　　TYPE: unsigned int

FOURTH ARGUMENT: args3
　　TYPE: float

FIFTH ARGUMENT: args4
　　TYPE: double

FUNCTION main INFORMATION ⌐702 func CALL TYPE INFORMATION IN FUNCTION main ⌐731

FUNCTION INFORMATION: func

ACTUAL ARGUMENT ⌐741

FIRST ARGUMENT:
　　TYPE: int
　　VALUE: 1

SECOND ARGUMENT:
　　TYPE: long
　　VALUE: 2L

THIRD ARGUMENT:
　　TYPE: unsigned int
　　VALUE: 3u

FOURTH ARGUMENT:
　　TYPE: float
　　VALUE: 4.0F

FIFTH ARGUMENT:
　　TYPE: double
　　VALUE: 5.0

FIG. 13

```
// (a)
void func(int head, long args1, unsigned int args2, float args3, double args4)
{
    std::cout << head << std::endl;
    std::cout << args1 << std::endl;
    std::cout << args2 << std::endl;
    std::cout << args3 << std::endl;
    std::cout << args4 << std::endl;
    std::cout << "end" << std::endl;
}
```
⌐1301

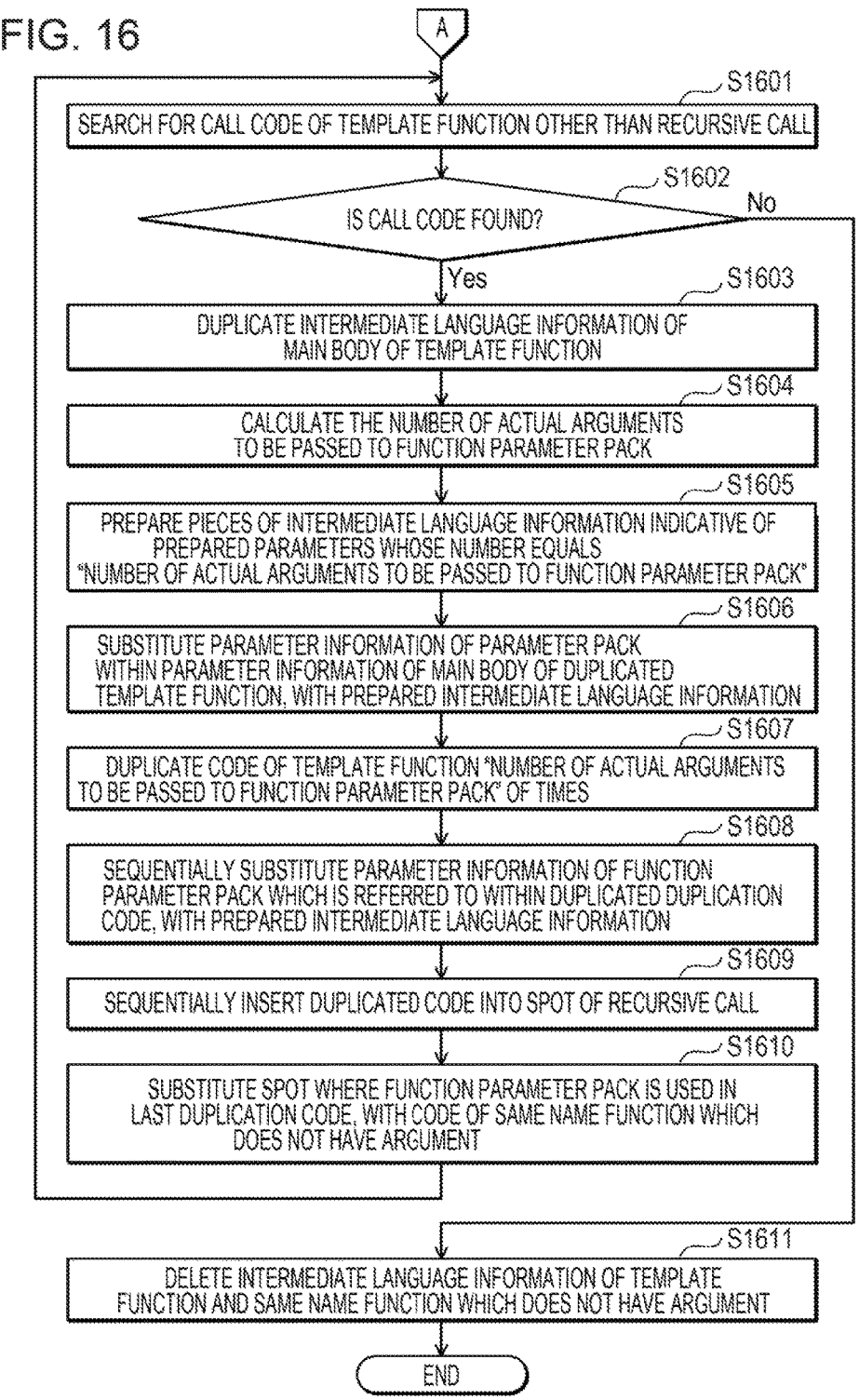

APPARATUS AND METHOD TO COMPILE A VARIADIC TEMPLATE FUNCTION

CROSS-REFERENCE TO RELATED APPLICATION

This application is based upon and claims the benefit of priority of the prior Japanese Patent Application No. 2016-096559, filed on May 12, 2016, the entire contents of which are incorporated herein by reference.

FIELD

The embodiments discussed herein are related to apparatus and method to compile a variadic template function.

BACKGROUND

In the related art, there is a technique of defining a template function according to a description referred to as a template in source code. A compiler determines a type of a parameter, based on a type of an actual argument of a calling source of the template function, and generates a function which includes a parameter of the determined type. Furthermore, there is a technique of defining a template function including a variable number of parameters. In addition, there is a technique referred to as inline optimization in which overhead in a function call is reduced by inserting a process of a called function into a read source of the function.

Japanese Laid-open Patent Publication No. 2002-140198 describes an example of the related art in which, for example, a process of a constructor function is divided into a virtual function pointer setting statement and the other statements, inline expansion is performed on the virtual function pointer setting statement immediately after class variable declaration, and the other statements are expanded in a calling source of the function. In addition, Japanese Laid-open Patent Publication No. 2005-141380 describes another example of the related art in which a dependency between a function definition code and a template parameter is analyzed, in a case of no dependency, a common function is defined a plurality of function definitions before communalization are deleted, and a function call before the communalization is substituted with a common function call.

SUMMARY

According to an aspect of the invention, an apparatus duplicates a process code of a variadic template function that has a variable number of parameters included in a source code, in association with each of actual arguments included in an actual-argument list corresponding to a variadic parameter defined by a variadic operator that packs the variable number of parameters of the variadic template function, and performs a substitution process including substituting, in each of the duplicated process codes, another parameter that is one of parameters of the variadic template function and different from the variadic parameter, with a prepared parameter that is prepared to accept an actual argument, in the actual-argument list, that is associated with the each duplicated process code. In a case where the another parameter in each process code becomes an actual argument of another function different from the variadic template function, the apparatus executes a search process of searching for a first function which matches a type of the another parameter or a generation process of generating the first function, based on a template function included in the source code, and substitutes a first code for calling the another function with a second code for calling the first function which is acquired through the search process or the generation process. The apparatus performs a function parameter-pack expansion process including: firstly inserting, into a recursive call part in a process code of the variadic template function, a first one of the duplicated process codes that is associated with an actual argument at a head of the actual-argument list, and repeating an insertion process of inserting, into a recursive call part in a previously inserted one of the duplicated process codes, a next one of the duplicated process codes associated with an actual argument that is subsequent, in the actual-argument list, to an actual argument associated with the previously inserted one of the duplicated codes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of an operation of an information processing apparatus, according to an embodiment;

FIG. 2 is a diagram illustrating an example of instantiation of a template function, according to an embodiment;

FIG. 3 is a diagram illustrating an example of a hardware configuration of an information processing apparatus, according to an embodiment;

FIG. 4 is a diagram illustrating an example of a functional configuration of an information processing apparatus, according to an embodiment;

FIG. 5 is a diagram illustrating an example of a source code, according to an embodiment;

FIG. 6 is a diagram illustrating an example of an instantiation result of a source code, according to an embodiment;

FIG. 10 is a diagram illustrating an example of a procedure of function parameter pack expansion, according to an embodiment;

FIG. 12 is a diagram illustrating an example of intermediate language information acquired after function parameter pack expansion, according to an embodiment;

FIG. 13 is a diagram illustrating an example of a source image acquired after function parameter pack expansion, according to an embodiment;

FIG. 16 is a diagram illustrating an example of an operational flowchart for a function parameter pack expansion process, according to an embodiment.

DESCRIPTION OF EMBODIMENTS

Figure 7:
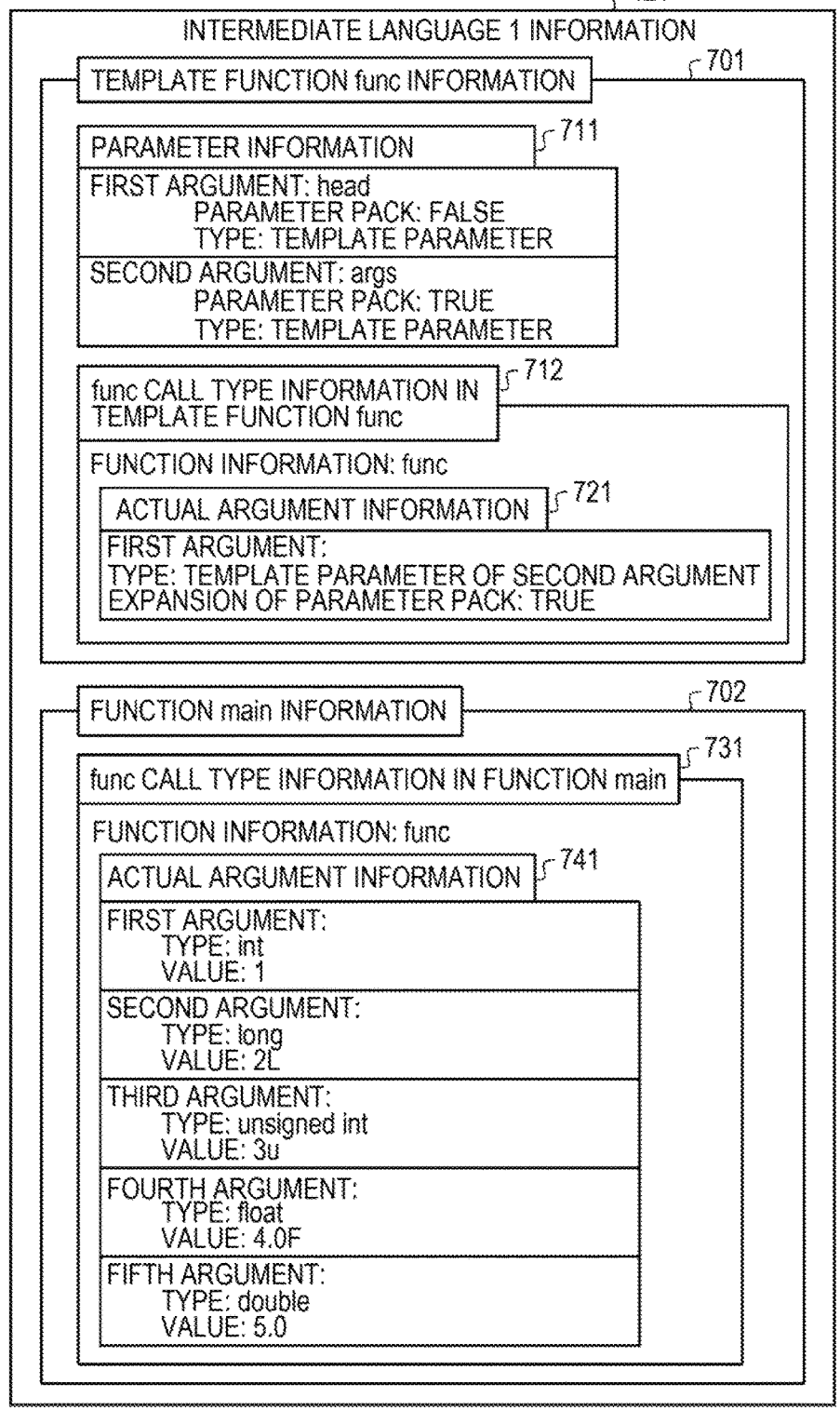
FIG. 7 is a diagram illustrating an example of intermediate language information of a source code, according to an embodiment.

According to the related art, in a case where a template function including a variable number of parameters is compiled, a needless function may be generated. Specifically, in a case where a process of a function which is generated from the template function including a variable number of parameters is inserted into a calling source through the inline optimization, the generated function may remain even though the function is not called from others and thus being needless. Furthermore, as the needless function increases, a memory size which is used by a compiler increases, and thus time which is taken for compiling increases. Hereinafter, a template function including a variable number of parameters will also be referred to as "a variadic template function".

It is desirable to suppress generation of a needless function in a case of compiling a variadic template function including a variable number of parameters.

Hereinafter, embodiments of an information processing apparatus, a compiling method, and a compiling program according to the disclosure are described in detail with reference to the accompanying drawings.

FIG. 1 is an explanatory view illustrating an operational example of an information processing apparatus 101 according to an embodiment. The information processing apparatus 101 illustrated in FIG. 1 is a computer which performs compiling. For example, the information processing apparatus 101 compiles a source code prepared by a user, and prepares an executable program. Hereinafter, the executable program is referred to as an "object program". Here, the prepared object program may be intended for the information processing apparatus 101 or may be intended for another computer. In addition, the information processing apparatus 101 is, for example, a computer which is used in a high performance computing (HPC) field.

The source code prepared by the user is written according to a programming language. There is C++ as the programming language. In C++, it is possible to define a template function according to a description referred to as a template. A compiler in conformity to C++ standards performs a process referred to as instantiation of a template function, in which a type of a parameter is determined based on a type of an actual argument at a calling source of the template function and a function including a parameter of the determined type is generated. An example of the instantiation of the template function is described with reference to FIG. 2. Here, the parameter indicates a variable, which accepts a value passed from a calling source in execution, among variables which are defined in the function. In contrast, the actual argument is a value which is passed to the function when the function is called. The parameter and the actual argument are collectively referred to as "arguments".

Furthermore, a variadic template which is used from C++11 (international organization for standardization (ISO))/(international electro-technical commission (IEC) 14882: 2011) introduces a parameter pack which is used to process a variable number of parameters in a lump. A template argument includes a template parameter pack which processes a type information list in a lump. Hereinafter, a template function for a variadic template will be referred to as "a variadic template function." An argument of the variadic template function includes a function parameter pack which processes an argument list, to which type information of the template parameter pack is applied, in a lump. Specifically, an actual-argument list of a calling source of the function of the parameter is passed to the parameter which is defined based on an operator " . . . " that binds a variable number of parameters. " . . . " is referred to as a pack operator or an unpack operator. For example, it is assumed that the template function is defined as follows.

```
template <class TH, class... Args>
void func(TH head, Args... args)
{
...
}
```

In the above-described definition, a parameter "args" is defined with a type in which an unpack operator " . . . " of "Args . . . " is given. Here, for example, in a case where a call of "func(1, 2L, 3u);" exists, an actual-argument list, such as {2L, 3u}, in which actual arguments of a calling source are bound, is passed to the parameter "args". In addition, as another example, in a case where a call of "func(1, 2L, 3u, 4.0F, 5.0);" exists, an actual-argument list, such as {2L, 3u, 4.0F, 5.0}, is passed to the parameter "args". That is, in the above-described definition, the parameter "args" is a second argument of the function func( ), and thus an actual-argument list including actual arguments of the second one and after the second one in the actual-argument list of the calling source is passed. As described above, in the actual-argument list of the calling source, an actual-argument list, in which an actual argument corresponding to a location of the parameter that is included in the function parameter pack in the template function is at the head, is passed to the parameter which is included in the function parameter pack. Hereinafter, a parameter "args" defined with a type in which an unpack operator " . . . " of "Args . . . " is given will be also referred to as "a variadic parameter."

In addition, there is a technique referred to as inline optimization in which overhead in a function call is reduced by inserting a process of a called function into a read source of the function.

As described above, in C++, productivity is improved using classes, templates, and the like. However, in a case of compiling the template function including a variable number of parameters, a needless function may be generated. Specifically, in a case where a process of a function which is generated from the template function including a variable number of parameters is inserted into a calling source through the inline optimization, the generated function may remain even though the function is not called from others and thus being needless. Furthermore, as the needless function increases, a memory size which is used by a compiler increases, and thus time which is taken for compiling increases.

That is, in a case where the inline optimization is not used, it is difficult to expand a code of a recursive call function. However, if the needless function remains even though the inline optimization is performed, a negative influence is given to translation performance.

Accordingly, in the embodiment, in a case where the template function including variable number of parameters is compiled, parameters in each process duplicated from a process of a function are substituted as many as actual arguments which are passed to a variable number of parameters, with parameters for accepting actual arguments and the parameters are sequentially inserted into recursive call parts of the function.

An operational example of the information processing apparatus 101 is described with reference to FIG. 1. The information processing apparatus 101 stores a source code "src". The source code "src" includes a template function func( ), which has a variable number of parameters, as a code 102, and a function main( ), which calls the function func( ), as a code 103. In addition, the code 102 includes a code 104 as a process of the function func( ).

In the embodiment, since the template function func( )includes a variable number of parameters, that is, a function parameter pack, function parameter pack expansion is performed. Here, the information processing apparatus 101 determines whether each function is a target on which the function parameter pack expansion is performed. A detailed determination reference is described with reference to FIG. 7. In the example of FIG. 1, the information processing apparatus 101 determines that the function func( ) is a template function corresponding to the target on which the parameter pack expansion is performed. Hereinafter, the template function corresponding to the target on which the parameter pack expansion is performed may be referred to as a "target function".

As illustrated in (1) of FIG. 1, the information processing apparatus 101 duplicates a process code of the function func( ) as many as the actual arguments included in the actual-argument list of the calling source of the function func( ) corresponding to any one of the parameters which are defined based on " . . . " of the function of the function func( ). In a case of FIG. 1, any one of the parameters which becomes the function parameter pack is "args" which is defined based on the operator " . . . ". Furthermore, the actual-argument list corresponding to the parameter "args" becomes {2L, 3u} within "func(1, 2L, 3u)" which calls the function func( ) in code 103, and the number of actual arguments which are included in the actual-argument list is two. In addition, it is possible to calculate the number of actual arguments which are passed to the function parameter pack by using the following Equation (1).

Number of actual arguments which are passed to function parameter pack=number of actual arguments for function call−location of function parameter pack+1 (1)

Accordingly, the information processing apparatus 101 duplicates the code 104 which becomes the process of the function func( ) two times. The information processing apparatus 101 acquires code 111 and 112 by duplicating the code 104.

Subsequently, as illustrated in (2) of FIG. 1, the information processing apparatus 101 substitutes another parameter except the parameter "args" among the parameters of the function func( ) in each process code of the duplicated process codes corresponding to the number of duplications, with each prepared parameter. Here, another parameter except the parameter "args" among the parameters of the function func( ) is "head" which is a first argument. The number of other parameters may be one or more. The prepared parameter is a parameter which is prepared to accept each of the actual arguments included in the actual-argument list {2L, 3u} corresponding to the parameter "args". Specifically, the information processing apparatus 101 generates prepared parameters corresponding to the number acquired in Equation (1) in a memory of the information processing apparatus 101. Here, a name of each of the prepared parameters does not matter if it is possible to distinguish from another parameter, another prepared parameter, a local variable, and the like in a range where each of the prepared parameters is referred to. Furthermore, types of the prepared parameters are the same as types of the relevant actual arguments, respectively. In addition, although each of the prepared parameters is prepared in the memory of the information processing apparatus 101, the order of the prepared parameters does not matter. Hereinafter, for simplification of explanation, the order of the prepared parameters is the same as that of the relevant actual arguments, respectively.

For example, the information processing apparatus 101 substitutes "head" in the code 111 with a prepared parameter "args1" which is prepared to accept the first actual argument "2L" of the actual-argument list. A type of the prepared parameter "args1" is "long" corresponding to the actual argument "2L". Furthermore, the information processing apparatus 101 substitutes "head" in the code 112 with a prepared parameter "args2" which is prepared to accept the second actual argument "3u" of the actual-argument list. A type of the prepared parameter "args2" is "unsigned int" corresponding to the actual argument "3u". As mentioned above, the duplicated process codes are respectively associated with the prepared parameters which respectively accept the actual arguments in the actual-argument list.

Furthermore, the information processing apparatus 101 substitutes a character string "args . . . " in the codes 111 and 112, which is acquired such that the parameter "args" is coupled with " . . . ", with prepared parameters which accepts all the actual arguments positioned behind the actual argument accepted by each prepared parameter. Here, the meaning of "args . . . " indicates expansion of the actual-argument list which is bound with "args". Specifically, in the code 111, the information processing apparatus 101 substitutes the character string "args . . . " with the prepared parameter "args2" which accepts "3u" as the actual argument which is positioned behind the actual argument "2L" accepted by the prepared parameter "args1" in the code 111. In addition, in the code 112, an actual argument, which is positioned behind the actual argument "3u" accepted by the prepared parameter "args1" in the code 111, does not exist. Therefore, in this case, the information processing apparatus 101 substitutes the character string "args . . . " with an empty character string " ".

Here, in a case where another parameter in each of the duplicated processes is an actual argument of another function which is different from the function func( ), the information processing apparatus 101 executes a search process or a generation process, and substitutes another function call with a function call which is acquired in the search process or the generation process. Here, the search process is a process of searching for a function which matches a type of another parameter. In addition, the generation process indicates instantiation of the template function for generating the function which matches the type of another parameter based on the template function included in the source code "src". In the example of FIG. 1, "head", which is another parameter, is not an actual argument of another function which is different from the function func( ). Therefore, the information processing apparatus 101 does not perform a process of substituting another function call with a function call acquired through the search process or the generation process. An example of the process of substituting another function call with the function call acquired through the search process or the generation process is described with reference to FIG. 11.

Furthermore, as illustrated in (3) of FIG. 1, the information processing apparatus 101 inserts, into a recursive call part in the process code of the function func( ), a process code in which another parameter is substituted with the prepared parameter, which accepts a head actual argument of the actual-argument list, among the processes corresponding to the number of substitutions. Furthermore, the information processing apparatus 101 inserts, into a recursive call part in each of the duplicated process codes, a subsequent duplicated process code of the each duplicated process code. Here, the subsequent duplicated process code of the each duplicated process code is described using the order of positions in the actual-argument list, at which the actual arguments are located. The subsequent duplicated process code of each duplicated process code is one of the duplicated process codes, in which another parameter is substituted with a prepared parameter which accepts an actual argument at a position subsequent to the actual argument accepted by the prepared parameter in the each duplicated process code.

For example, a code 121 is inserted into the recursive call part of the function func( ). Furthermore, the information processing apparatus 101 inserts, into a recursive call part of the code 121, a code 122, in which another parameter is substituted with the prepared parameter "args2" that accepts the actual argument "3u" at a position subsequent to the actual argument "2L" accepted by the prepared parameter "args1" associated with the code 121.

As described above, the information processing apparatus 101 may suppress preparation of a needless function. Furthermore, suppressing the preparation of the needless function allows a size of a process code, which becomes input for optimization, to be reduced, and thus it is possible to reduce a processing time for the optimization, and a desired memory size. An example of the instantiation of the template function is described with reference to FIG. 2.

FIG. 2 is an explanatory view illustrating an example of the instantiation of the template function. In a case where an object is generated through instantiation of the template function, information of the parameter is generated based on information of the actual argument. For example, the source code 201 illustrated in FIG. 2 is a program which includes a template function foo( ). The template function foo( ) includes a template argument "param" as the parameter.

In a case where a call of the template function foo( ) is detected, the compiler performs instantiation of the template function foo( ). Here, the compiler determines a type "int" of the parameter from an actual argument "10", and generates as a code 202 the function foo( ) corresponding to the actual argument, such as "void foo(int param){ }". As described above, in the embodiment, instantiation of the template function using type information is intended. A hardware configuration of the information processing apparatus 101 is described with reference to FIG. 3.

(View Illustrating Hardware Configuration of Information Processing Apparatus 101)

FIG. 3 is an explanatory view illustrating an example of a hardware configuration of the information processing apparatus 101. In FIG. 3, the information processing apparatus 101 includes a central processing unit (CPU) 301, a read-only memory (ROM) 302, and a random access memory (RAM) 303. In addition, the information processing apparatus 101 includes a disk drive 304, a disk 305, and a communication interface 306. In addition, the CPU 301, the ROM 302, the RAM 303, the disk drive 304, and the communication interface 306 are respectively coupled to each other through a bus 307.

The CPU 301 is an arithmetic processing apparatus that manages control of the whole information processing apparatus 101. In addition, the information processing apparatus 101 may include a plurality of CPUs. The ROM 302 is a nonvolatile memory that stores a program such as a boot program. The RAM 303 is a volatile memory that is used as a work area of the CPU 301.

The disk drive 304 is a control device that controls read and write of data for a disk 305 under the control of the CPU 301. It is possible to use, for example, a disk drive, an optical disk drive, a solid state drive, or the like as the disk drive 304. The disk 305 is a nonvolatile memory that stores data which is written under the control of the disk drive 304. For example, in a case where the disk drive 304 is a magnetic disk drive, it is possible to use a magnetic disk as the disk 305. In addition, in a case where the disk drive 304 is an optical disk drive, it is possible to use an optical disk as the disk 305. In addition, in a case where the disk drive 304 is a solid state drive, it is possible to use a semiconductor memory, which is formed by a semiconductor device so-called a semiconductor disk, as the disk 305.

The communication interface 306 is a control device that manages a network and an internal interface, and controls input and output of data from another device. Specifically, the communication interface 306 is coupled to another device, such as a user terminal, which uses the information processing apparatus 101 via a network through a communication line. It is possible to use, for example, a modem, a local area network (LAN) adapter, or the like as the communication interface 306.

In addition, in a case where a manager of the information processing apparatus 101 directly operates the information processing apparatus 101, the information processing apparatus 101 may include hardware such as a display, a keyboard, and a mouse.

(Functional Configuration of Information Processing Apparatus 101)

FIG. 4 is an explanatory view illustrating an example of a functional configuration of the information processing apparatus 101. The information processing apparatus 101 includes a control unit 400. The control unit 400 includes a syntactic and semantic analysis unit 401, a function parameter pack expansion unit 402, an intermediate language conversion unit 403, and an optimization and code generation unit 404. The control unit 400 realizes a function of each unit by causing the CPU 301 to execute a program stored in a storage device. Specifically, the storage device includes, for example, the ROM 302, the RAM 303, and the disk 305 which are illustrated in FIG. 3. In addition, a processing result of each unit is stored in the RAM 303, a register of the CPU 301, a cache memory of the CPU 301, or the like.

Here, a compiling process includes a front end in which lexical analysis, syntactic analysis, and semantic analysis are performed, and a back end in which an optimization process and code generation are performed. The front end is a process which depends on specifications of the programming language and does not depend on architecture of a target. In contrast, the back end is a process which does not depend on the specifications of the programming language and depends on the architecture of the target. The syntactic and semantic analysis unit 401 to the intermediate language conversion unit 403 are included in the front end. In addition, the optimization and code generation unit 404 is included in the back end.

In addition, the information processing apparatus 101 is able to access the source code "src", intermediate language 1 information 421, intermediate language 1 information 422 acquired after the function parameter pack expansion, intermediate language 2 information 423, and object program obj. The source code "src", the intermediate language 1 information 421, and the intermediate language 2 information 423 are stored in the storage device such as the RAM 303 and the disk 305.

The syntactic and semantic analysis unit 401 reads the source code "src", performs the syntactic analysis and the semantic analysis, and generates the intermediate language 1 information 421. An example of the source code "src" is illustrated in FIG. 5. In addition, an example of the intermediate language 1 information 421 is illustrated in FIG. 7.

The function parameter pack expansion unit 402 expands the function parameter pack from the intermediate language 1 information 421, and generates the intermediate language 1 information 422 acquired after function parameter pack expansion. An example of the intermediate language 1 information 422 acquired after function parameter pack expansion is illustrated in FIG. 12. In addition, the function parameter pack expansion unit 402 includes a duplication unit 411, a substitution unit 412, and an insertion unit 413. In description with reference to FIG. 4, a target template function, which includes the function parameter pack, is referred to as a target function.

The duplication unit 411 duplicates a process code of the target function included in the source code "src" as many as the number of actual arguments included in the actual-argument list of the calling source of the target function corresponding to a variadic parameter defined based on the unpack operator " . . . ".

The substitution unit 412 substitutes another parameter except the variadic parameter, among the parameters of the target function, in each process code of the duplicated process codes corresponding to the number of duplications performed by the duplication unit 411, with a prepared parameter which is prepared in order to accept an actual argument, included in the actual-argument list, which is associated with the each process code.

In addition, in a case where another parameter in each process code is an actual argument of another function which is different from the target function, the substitution unit 412 performs a search process or a generation process, and substitutes the another function call with function call which is acquired in the search process or the generation process.

In addition, the substitution unit 412 substitutes another parameter in each duplicated process code with a prepared parameter, and, at the same time, substitutes a variadic parameter in the each duplicated process code with other prepared parameters which accept the respective actual arguments located behind the actual argument accepted by the prepared parameter.

The insertion unit 413 inserts, into a recursive call part in a process code of the target function, the duplicated process code in which another parameter is substituted with the prepared parameter that accepts an actual argument at a head of the actual-argument list, among the duplicated process codes corresponding to the number of substitutions performed by the substitution unit 412. Furthermore, the insertion unit 413 inserts, into a recursive call part in each duplicated process code, a duplicated process code in which another parameter is substituted with the prepared parameter that accepts a next actual argument at a position, in the actual-argument list, subsequent to an actual argument accepted by the prepared parameter associated with the each duplicated process code.

Here, the source code "src" includes a function, which includes no parameters and has the same name as the target template function. The insertion unit 413 inserts a process code of the above-described function which has the same name into the recursive call part of the duplicated process code in which another parameter is substituted with a prepared parameter that accepts an actual argument at the end of the actual-argument list, among the duplicated process codes corresponding to the number of substitutions performed by the substitution unit 412.

The source code may include a first function, which includes no parameters and has the same name as the target template function, and a second function which includes one parameter and has the same name as the target template function. Furthermore, the insertion unit 413 inserts, into the recursive call part of the process code in which another format argument is substituted with the prepared parameter that accepts an actual argument at the end of the actual-argument list, one of the process codes of the first and second functions, depending on the actual argument of a recursive call part in the first function or the second function, among the process codes corresponding to the number of substitutions. For example, in the recursive call part of the process code in which another parameter is substituted with the prepared parameter that accepts an actual argument at the end in the actual-argument list, the insertion unit 413 inserts a process code of the first function in a case where the number of the actual arguments is 0 and inserts a process code of the second function in a case where the number of the actual arguments is 1.

The intermediate language conversion unit 403 generates the intermediate language 2 information 423 from the intermediate language 1 information 422 acquired after function parameter pack expansion. The optimization and code generation unit 404 generates the object program obj from the intermediate language 2 information 423.

FIG. 5 is an explanatory view illustrating an example of the source code "src". FIG. 5 illustrates the source code "src" using a function parameter pack. A code 501 in the source code "src" is a code which describes a function func( ) which includes no arguments and does not have a return value. In addition, a code 502 in the source code "src" is a code which describes a template function func( ). In addition, a code 503 in the source code "src" is a code which describes a function main( ) which includes no arguments and has a return value with a type of "int".

Furthermore, in a first line of the code 502, a template argument is defined and, specifically, a template parameter pack "Args" is defined. In addition, in a second line of the code 502, the function func( ) to which the function parameter pack is applied is defined, and, furthermore, a parameter "args" to which type information "Args" of the template parameter pack is applied is defined. Here, " . . . " which is given before the parameter "args" or the like is referred to as a pack operator. In addition, in a fifth line of code 502, reference of the function func( ) to which the function parameter pack is applied is defined as a code 511. As described above, the code 502 includes a recursive call.

In a third line of the code 503, argument passing to the function func( ) to which the function parameter pack is applied is defined as a code 512. An instantiation result of the source code "src" is described with reference to FIG. 6.

FIG. 6 is an explanatory view illustrating an example of the instantiation result of the source code "src". In a manner similar to the instantiation of the template function illustrated in FIG. 2, information of the parameter is generated in the same manner also in a case of the template function which includes the function parameter pack. As illustrated in an instantiation result 600 of FIG. 6, functions 601 to 605 are generated as the instantiation result of the source code "src". The instantiation result 600 illustrated in FIG. 6 expresses an intermediate language, which is generated by a processing system, as a source image.

A function 601 is a function func( ) which is generated from a call of the code 511, that is, "func(1, 2L, 3u, 4.0F, 5.0);". The function 601 includes a recursive call of func( ) as a code 611.

A function 602 is a function func( ) which is generated from a call of the code 611, that is, "func(args1, args2, args3, args4);". The function 602 includes a recursive call of func( ) as a code 612.

A function 603 is a function func( ) which is generated from a call of the code 612, that is, "func(args1, args2, args3);". The function 603 includes a recursive call of func( ) as a code 613.

A function 604 is a function func( ) which is generated from a call of the code 613, that is, "func(args1, args2);". The function func( ) 604 includes a recursive call of func( )as a code 614.

The function 605 is a function func( ) which is generated from a call of the code 614, that is, func(args1);". The function 605 includes a recursive call of func( ) as a code 615.

Since the functions 602 to 605, among the functions 601 to 605, are indirectly generated from the reference of the function parameter pack described in the code 511, calling spots of the functions 602 to 605 are closed in translation units.

As described above, although the functions 601 to 605 are generated as the results of instantiation of the source code "src", the function 601 is directly called from the code 511, and the functions 602 to 605 are called from the function 601. Here, in a case where it is possible to expand processes of the functions 602 to 605 in the function 601, the functions 602 to 605 may be deleted. A method of not generating the functions 602 to 605 is described with reference to FIGS. 7 to 13. First, an example of the intermediate language 1 information 421 at a time before the parameter pack expansion is described with reference to FIG. 7.

FIG. 7 is an explanatory view illustrating an example of the intermediate language 1 information 421 of the source code "src". The intermediate language 1 information 421 illustrated in FIG. 7 includes template function func information 701 and function main information 702.

The template function func information 701 includes parameter information 711 and func call type information 712 in the template function func. The parameter information 711 indicates that the first argument is "head" and the second argument is "args". In addition, the parameter information 711 indicates that a parameter pack of the parameter "head" is FALSE and a type is a template parameter. Similarly, the parameter information 711 indicates that a parameter pack of the parameter "args" is TRUE and a type is a template parameter.

The func call type information 712 in the template function func includes actual argument information 721 as information which is used to call the function information func. The actual argument information 721 indicates the first argument in which a type is a template parameter of the second argument and expansion of the parameter pack is TRUE.

The function main information 702 includes func call type information 731 in the main function. The func call type information 731 in the main function includes actual argument information 741 as information which is used to call the function information func. The actual argument information 741 indicates that a type of the first argument is an int type and a value of the first argument is 1. In addition, the actual argument information 741 indicates that a type of the second argument is a "long" type and a value of the second argument is "2L". In addition, the actual argument information 741 indicates that a type of the third argument is an "unsigned int" type and a value of the third argument is "3u". In addition, the actual argument information 741 indicates that a type of the fourth argument is a "float" type and a value of the fourth argument is "4.0F". In addition, the actual argument information 741 indicates that a type of the fifth argument is a "double" type and a value of the fifth argument is "5.0".

Figure 15:
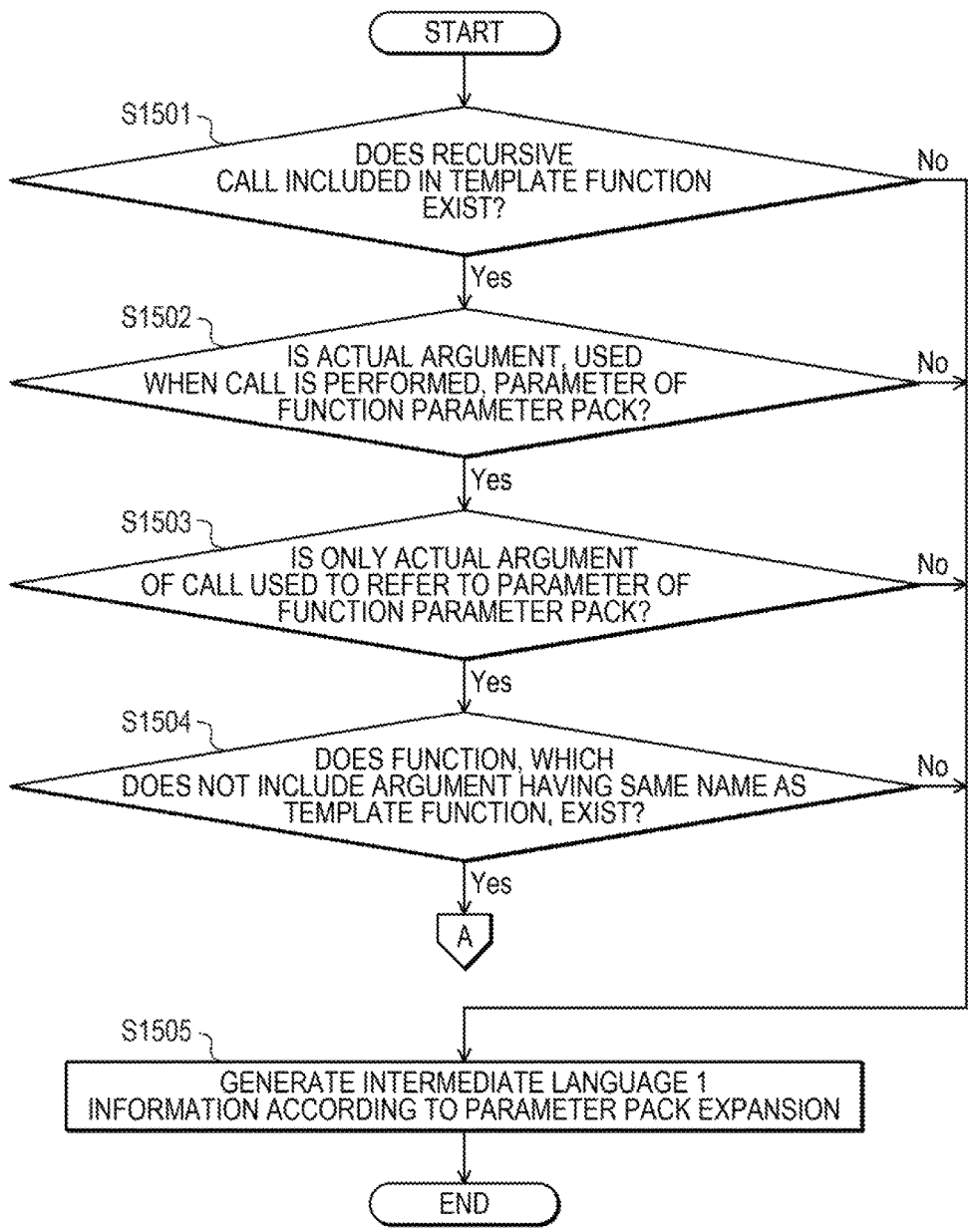
FIG. 15 is a diagram illustrating an example of an operational flowchart for a function parameter pack expansion process, according to an embodiment.

A method of expanding a recursive call function using a function parameter pack for the template function func( ) is described with reference to FIGS. 8 to 11. First, the information processing apparatus 101 determines whether or not all of the following four conditions are satisfied, in order to determine whether or not expansion of the parameter pack is performed. A detailed flowchart of the conditions is illustrated in FIG. 15.

A first condition is that a function, which is a target of determination of whether or not parameter pack expansion is performed, is a template function. A second condition is that a recursive call exists in the above-described function which is the target of the determination. A third condition is that an actual argument of the recursive call is a parameter of a function parameter pack. A fourth condition is that, except the actual argument of the recursive call, the parameter of the function parameter pack is not referred to. In a case where the fourth condition is not satisfied, inline expansion becomes complex, and thus, in the embodiment, it is assumed that inline optimization is not performed.

Since the template function func( ), which is included in code 502, satisfies the above-described four conditions, the template function func( ) becomes a target template function on which the expansion of the function parameter pack is performed. A procedure of function parameter pack expansion is described with reference to FIGS. 8 to 11.

Figure 8:
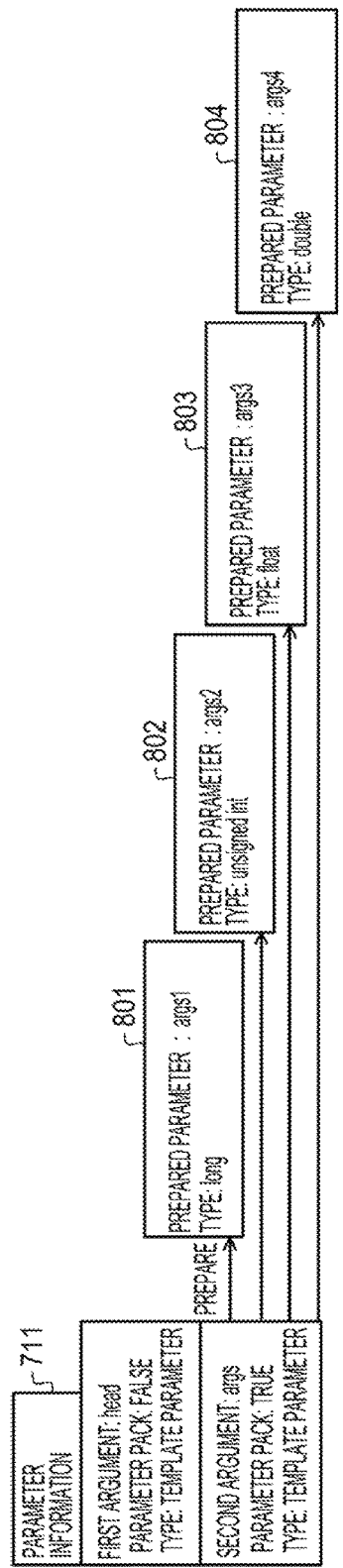
FIG. 8 is a diagram illustrating an example of a procedure of function parameter pack expansion, according to an embodiment.

FIG. 8 is an explanatory view (first) illustrating a procedure of the function parameter pack expansion. First, the information processing apparatus 101 duplicates intermediate language information of the main body of the template function func( ), that is, template function func information 701. Subsequently, the information processing apparatus 101 calculates the number of actual arguments which are passed to the function parameter pack of the template function func( ). Specifically, the information processing apparatus 101 calculates the number of actual arguments which are passed to the function parameter pack according to Equation (1). A location of the function parameter pack in Equation (1) becomes 2 because the location of "args" is the second from the left in the example of the code 502. Accordingly, in the code 502, the number of actual arguments which are passed to the function parameter pack is acquired such that 5−2+1=4. In addition, an actual-argument list which is passed to the function parameter pack becomes {2L, 3u, 4.0F, 5.0}.

Furthermore, the information processing apparatus 101 prepares intermediate language information of parameters whose number is equal to the calculated number of actual arguments, based on the intermediate language information of the parameters of the function parameter pack. In an example of FIG. 8, the information processing apparatus 101 prepares pieces of intermediate language information 801 to 804 of four parameters, based on intermediate language information of the second argument of the parameter information 711. Here, the four parameters of the intermediate language information 801 to 804 are arguments which accept actual arguments which are passed to the function parameter pack, and become the prepared parameters which are described above with reference to in FIG. 1. The information processing apparatus 101 registers the prepared intermediate language information 801 to 804 in the duplicated template function func information 701.

In addition, types of the prepared parameters of the intermediate language information 801 to 804 are the same as the types of the actual arguments of the function call. For example, the type of the prepared parameter of the intermediate language information 801 becomes "long" which is the type of an actual argument at a position, within the actual arguments of the function call, corresponding to the parameter of the function parameter pack. In addition, the type of the intermediate language information 802 becomes "unsigned int" that is a type of an actual argument at the second position from the position corresponding to the parameter of the function parameter pack. In addition, the type of the intermediate language information 803 becomes "float" that is a type of an actual argument at the third position from the position corresponding to the parameter of the function parameter pack. In addition, the type of the intermediate language information 804 becomes "double" that is a type of an actual argument at the fourth position from the position corresponding to the parameter of the function parameter pack. In addition, names of the prepared parameters of the intermediate language information 801 to 804 may include any name as long as it is possible to distinguish a prepared parameter from other parameters and variables in the range from which the prepared parameter is referred to, as illustrated in FIG. 1. In the example of FIG. 8, the names of the prepared parameters of the intermediate language information 801 to 804 become "args1 to args4" which are acquired by giving numbers to the parameter "args" of the function parameter pack.

Figure 9:
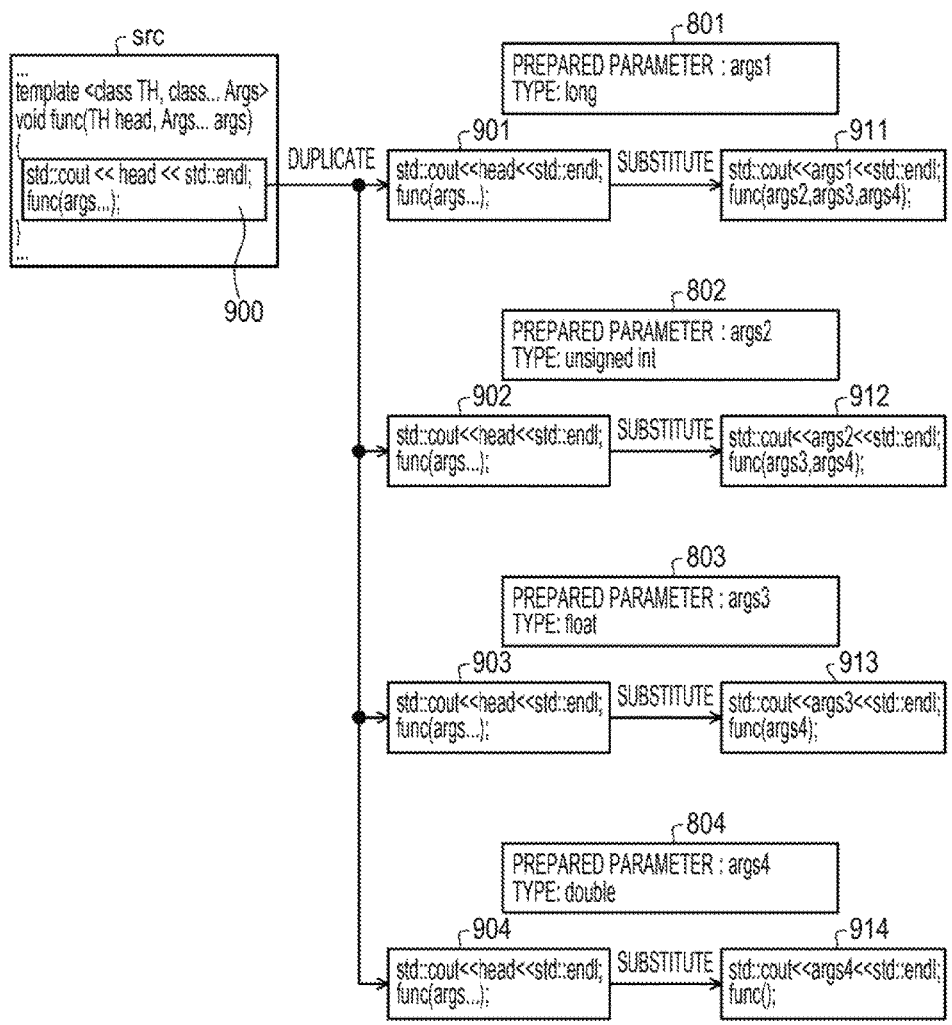
FIG. 9 is a diagram illustrating an example of a procedure of function parameter pack expansion, according to an embodiment.

FIG. 9 is an explanatory view (second) illustrating a procedure of the function parameter pack expansion. Subsequently, the information processing apparatus 101 duplicates a process of the object function's main body, specifically, codes of a statement and an equation as many times as the calculated number of actual arguments. In an example of FIG. 9, the information processing apparatus 101 duplicates a code 900, which represents a process of a template function func( )'s main body, four times, and acquires duplicated codes 901 to 904.

Furthermore, the information processing apparatus 101 substitutes another parameter, which is not the parameter of the function parameter pack that is referred to in the duplicated code, with a prepared parameter of the prepared intermediate language information for each of the duplicated codes 901 to 904. Furthermore, for each of the duplicated codes 901 to 904, the information processing apparatus 101 substitutes a parameter of the function parameter pack, which is referred to in the each duplicated code, with prepared parameters which accepts the respective actual arguments subsequent to the actual argument that is accepted by the prepared parameter with which another parameter in the each duplicated code is substituted.

Here, another parameter, which is not the parameter of the function parameter pack, is "head" in the example of FIG. 9. For example, in a case of a duplicated code 901, the information processing apparatus 101 substitutes "head" in the duplicated code 901 with a prepared parameter "args1" of the intermediate language information 801. Furthermore, the information processing apparatus 101 substitutes "args . . . " in the duplicated code 901 with the prepared parameters, that is, "args2", "args3", and "args4" which accept the respective actual arguments located behind the actual argument that is accepted by the parameter "args1", and acquires a duplicated code 911 after substitution.

Similarly, the information processing apparatus 101 substitutes "head" in a duplicated code 902 with prepared parameter "args2" of the intermediate language information 802, and substitutes "args . . . " in the duplicated code 902 with prepared parameters "args3" and "args4". After the substitution is performed, the information processing apparatus 101 acquires a duplicated code 912 after substitution. Similarly, the information processing apparatus 101 substitutes "head" in a duplicated code 903 with the parameter "args3" of the intermediate language information 803, and substitutes "args . . . " in the duplicated code 903 with a prepared parameter "args4". After the substitution is performed, the information processing apparatus 101 acquires a duplicated code 913 after substitution.

In addition, in a case where a duplicated code 904 is substituted, there is no actual argument after an actual argument which is accepted by "args4". Accordingly, the information processing apparatus 101 substitutes "head" in the duplicated code 904 with the parameter "args4" of the intermediate language information 804, and substitutes "args . . . " in the duplicated code 904 with "" which indicates there is no argument.

Here, there is a case in which the parameter, which is not the parameter of the function parameter pack, is an actual argument of another function which is different from the object function. A process in the case is described with reference to FIG. 11.

FIG. 10 is an explanatory view (third) illustrating a procedure of the function parameter pack expansion. Subsequently, the information processing apparatus 101 sequentially inserts duplicated codes, in which another parameter has been substituted with prepared parameters, into recursive call parts in the object function's main body. Here, the duplicated codes which are inserted may be duplicated codes acquired by substituting the parameters with the prepared parameters in FIG. 9 or may be duplicated codes acquired by substituting the function, which will be described with reference to FIG. 11. For example, in an example of FIG. 10, the information processing apparatus 101 inserts the duplicated code 911 into "func(args . . . );" which is the recursive call part of the code 900. Furthermore, the information processing apparatus 101 inserts the duplicated code 912 into "func(args2, args3, args4);" which is the recursive call part of the duplicated code 911. In this manner, the information processing apparatus 101 sequentially inserts the duplicated codes acquired through substitution into the recursive call parts in the object function's main body. The result illustrated at an upper part of FIG. 10 is a result acquired by sequentially inserting the duplicated codes 911 to 914 acquired after substitution into the recursive call parts of the code 900.

However, in a case where the object function returns a return value, the information processing apparatus 101 adds an assignment process such that values of the recursive call results in the duplicated codes are used as a value of an original recursive call result. For example, it is assumed that a last object function becomes "return a+b;". In this case, the information processing apparatus 101 adds an assignment process of generating a code, which causes a result of "a+b" to be stored in a temporal variable while deleting "return" in the duplicated code, and, furthermore, assigning a value of the temporal variable to a variable in which the original recursive call result is stored.

After the duplicated codes, whose parameters have been substituted with the prepared parameters, are sequentially inserted into the recursive call parts in the object function's main body, the recursive call in the last duplicated code is substituted with a process of the function's main body which does not include an argument and is prepared in advance. In the example of FIG. 10, "func( );" of the duplicated code 914 is substituted with the process of the code 501. In addition, in a case where there is a return value, the information processing apparatus 101 performs the assignment process in a manner similar to the above-described process. The result illustrated at the lower part of FIG. 10 is a result acquired by inserting the process of the code 501 into the recursive call part of the duplicated code 914.

In addition, in the example of FIG. 10, the last recursive call in the duplicated code does not include an actual argument. However, there is a case where the last recursive call in the duplicated code includes an actual argument. For example, there are cases where the intermediate language information of the template function includes pieces of information of three parameters, the parameter pack of first and second parameters is FALSE, and the parameter pack of a third parameter is TRUE. Here, in a case where the number of actual arguments of the function call is an odd number, there may be a case where the number of actual arguments of the last recursive call in the duplicated code is 1 and a case where the number of actual arguments is 0. Accordingly, a programmer prepares, in advance, a first function which does not include a parameter and a second function which includes one parameter. Meanwhile, in a case where the number of actual arguments of the function call is an even number, the number of actual arguments of the last recursive call in the duplicated code is 0.

Furthermore, in the case where the number of actual arguments of the last recursive call in the duplicated code is 0, the information processing apparatus 101 inserts the process of the first function. In the case where the number of actual arguments is 1, the process of the second function is inserted.

A case where the parameter, which is not the parameter of the function parameter pack, becomes the actual argument of another function which is different from the object function will be described with reference to FIG. 11.

Figure 11:
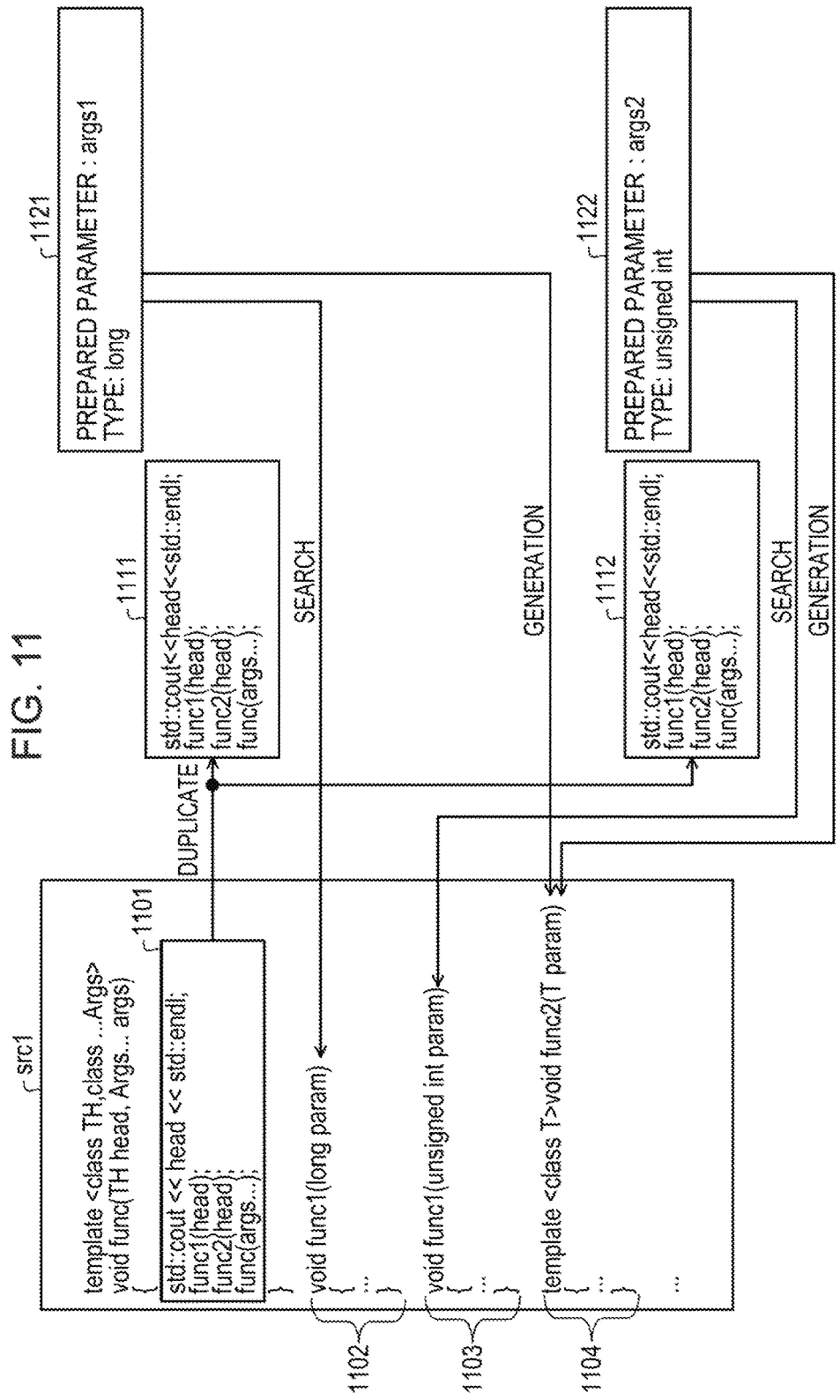
FIG. 11 is a diagram illustrating an example of a procedure of function parameter pack expansion, according to an embodiment.

FIG. 11 is an explanatory view (fourth) illustrating a procedure of the function parameter pack expansion. A process of source code "src1" illustrated in FIG. 11 includes a call of a function func1( ) and a call of a function func2( ), as other functions which are different from the object function, in addition to the process of the source code "src", as illustrated in a code 1101. Duplicated codes 1111 and 1112 are acquired by duplicating the code 1101. Furthermore, the source code "src1" includes a process of a function called "void func1(long param)" as a code 1102 and a process of a function called "void func1(unsigned int param)" as a code 1103. Furthermore, the source code "src1" includes definition of a template function called "template<class T>void func2(T param)" as a code 1104.

In addition, the information processing apparatus 101 includes pieces of intermediate language information 1121 and 1122 which are prepared according to the sequence illustrated in FIG. 8. The intermediate language information 1121 indicates that a name of the prepared parameter is "args1" and a type of the prepared parameter is a "long" type. In addition, the intermediate language information 1122 indicates that a name of the prepared parameter is "args2" and a type of the prepared parameter is an "unsigned int" type.

In a case where the parameter, which is not the parameter of the function parameter pack, becomes the actual argument of another function which is different from the object function, the information processing apparatus 101 performs, based on the type of the intermediate language information, a search process of searching for another function or a generation process of generating a function through instantiation. In a case of FIG. 11, the information processing apparatus 101 searches the source code "src1" for a function which has a function name "func1" and includes the parameter "long" that is a type of "args1" as the search process for the duplicated code 1111. In this case, the information processing apparatus 101 detects the code 1102, and converts "func1(head);" in the duplicated code 1111 into "func1(args1);" which is found through the search process.

In addition, the information processing apparatus 101, as the search process for the duplicated code 1111, searches the source code "src1" for a function which has a function name"func2" and includes a the parameter "long". In this case, the information processing apparatus 101 fails to find a function which meets the condition, but succeeds in finding a template function func2 which is defined in the code 1104. Accordingly, the information processing apparatus 101 generates, as the generation process, the function func2, which includes the parameter "long", from the code 1104. Furthermore, the information processing apparatus 101 converts "func2(head);" in the duplicated code 1111 into "func2(args1);" which is detected through the generation process. The information processing apparatus 101 performs the search process or the generation process on the duplicated code 1112 in the same manner.

FIG. 12 is an explanatory view illustrating an example of the intermediate language 1 information 422 acquired after function parameter pack expansion. The intermediate language 1 information 422 acquired after function parameter pack expansion illustrated in FIG. 12 includes function func information 1201 and the function main information 702. Since the function main information 702 is the same information as in FIG. 7, the description thereof is not repeated here.

The function func information 1201 includes parameter information 1211. The parameter information 1211 indicates that a first argument is "head" and a type of the first argument is "int". In addition, the parameter information 1211 indicates that a second argument is "args1" and a type of the second argument is "long". In addition, the parameter information 1211 indicates a third argument is "args2" and a type of the third argument is "unsigned int". In addition, the parameter information 1211 indicates that a fourth argument is "args3" and a type of the fourth argument is "float". In addition, the parameter information 1211 indicates that a fifth argument is "args4" and a type of the fifth argument is "double".

FIG. 13 is an explanatory view illustrating an example of a source image acquired after function parameter pack expansion. A program 1301 illustrated in FIG. 13 presents the intermediate language 1 information 422 acquired after function parameter pack expansion, which is generated by realizing the embodiment, as the source image.

Flowcharts illustrating the compiling process performed by the information processing apparatus 101 are described with reference to FIGS. 14 to 16.

Figure 14:
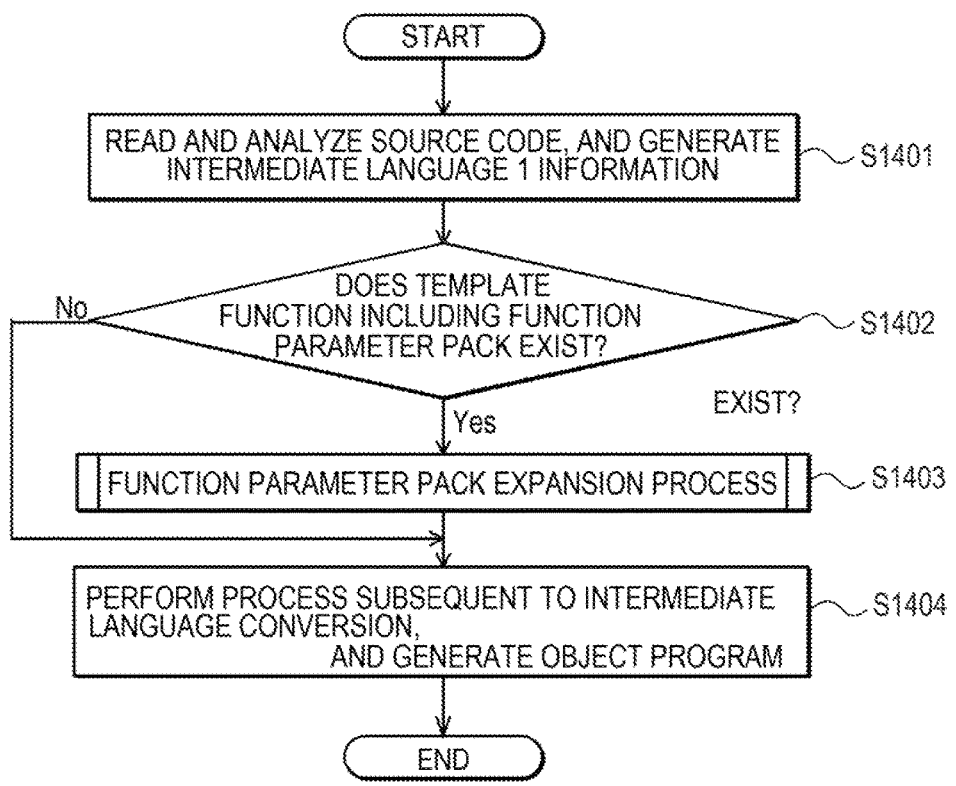
FIG. 14 is a diagram illustrating an example of an operational flowchart for a compiling process, according to an embodiment.

FIG. 14 is an operational flowchart illustrating an example of a sequence of the compiling process. The information processing apparatus 101 reads and analyzes the source code "src", and generates the intermediate language 1 information 421 (step S1401). Subsequently, the information processing apparatus 101 determines whether or not a template function which includes the function parameter pack (step S1402) exists. In a case where a template function which includes the function parameter pack exists (step S1402: Yes), the information processing apparatus 101 performs a function parameter pack expansion process (step S1403). The function parameter pack expansion process is described with reference to FIGS. 15 and 16.

After the process in step S1403 ends or in a case where the template function including the function parameter pack does not exist (step S1402: No), the information processing apparatus 101 performs a process subsequent to the intermediate language conversion to generate the object program obj (step S1404). After the process in step S1404 ends, the information processing apparatus 101 ends the compiling process.

FIG. 15 is an operational flowchart (first) illustrating an example of the function parameter pack expansion process sequence. In addition, FIG. 16 is an operational flowchart (second) illustrating the example of the function parameter pack expansion process sequence. The information processing apparatus 101 determines whether or not a recursive call exists in the template function (step S1501).

In a case where the recursive call does not exist in the template function (step S1501: No), the information processing apparatus 101 generates the intermediate language 1 information 422 acquired through the function parameter pack expansion (step S1505). In a case where the process in step S1505 is performed, the information processing apparatus 101 generates the intermediate language 1 information corresponding to FIG. 6. After the process in step S1505 is performed, the information processing apparatus 101 ends the function parameter pack expansion process.

In contrast, in a case where the recursive call exists in the template function (step S1501: Yes), the information processing apparatus 101 determines whether or not an actual argument, used when a call is performed, is a parameter of the function parameter pack (step S1502). In a case where the actual argument, used when the call is performed, is the parameter of the function parameter pack (step S1502: Yes), the information processing apparatus 101 determines whether or not only the actual argument of the call is used to refer to the parameter of the function parameter pack (step S1503). In a case where only the actual argument of the call is used to refer to the parameter of the function parameter pack (step S1503: Yes), the information processing apparatus 101 determines whether or not a function, which does not include an argument having the same name as the template function, exists (step S1504).

The information processing apparatus 101 transitions to a process in step S1505 in a case where the actual argument, used when the call is performed, is not the parameter of the function parameter pack (step S1502: No), in a case where an actual argument, in addition to the actual argument of the call, is used to refer to the parameter of the function parameter pack (step S1503: No), or in a case where the function which does not include the argument having the same name as the template function does not exist (step S1504: No).

In a case where the function which does not include the argument having the same name as the template function exists (step S1504: Yes), the information processing apparatus 101 searches for a call code of the template function except the recursive call (step S1601). Subsequently, the information processing apparatus 101 determines whether or not the call code is found (step S1602).

In a case where the call code is found (step S1602: Yes), the information processing apparatus 101 duplicates the intermediate language information of the template function's main body (step S1603). Subsequently, the information processing apparatus 101 calculates the number of actual arguments to be passed to the function parameter pack (step S1604). Furthermore, the information processing apparatus 101 prepares the intermediate language information which indicates prepared parameters whose number equals "the number of actual arguments to be passed to the function parameter pack" (step S1605). In a case where the process in step S1605 is performed, the information processing apparatus 101 prepares the intermediate language information corresponding to FIG. 8.

Subsequently, the information processing apparatus 101 substitutes the parameter information of the function parameter pack within the parameter information of the duplicated template function's main body, with the prepared intermediate language information (step S1606). The process in step S1606 is described with reference to FIGS. 7 and 8. The information processing apparatus 101 substitutes a second argument part of the parameter information 711 of the duplicated template function's main body, with the pieces of intermediate language information 801 to 804 which are prepared in FIG. 8.

Furthermore, the information processing apparatus 101 duplicates the code of the template function "the number of actual arguments to be passed to the function parameter pack" of times (step S1607). Subsequently, the information processing apparatus 101 sequentially substitutes the parameter information of the function parameter pack which is referred to in the duplicated code, with the prepared intermediate language information (the prepared parameters) (step S1608).

Furthermore, the information processing apparatus 101 sequentially inserts the duplicated code into a spot of a recursive call (step S1609). Here, specifically, the information processing apparatus 101 inserts, into a spot of the recursive call of the duplicated template function's main body, a first duplicated code in which the parameter information of the function parameter pack is substituted with the prepared parameter that accepts the head actual argument of an actual argument group corresponding to the parameter of the function parameter pack. Furthermore, the information processing apparatus 101 inserts a next duplicated code into the spot of the duplicated code duplicated immediately before the next duplicated code, in accordance with the order of the actual argument group. Thereafter, the information processing apparatus 101 substitutes the spot where the function parameter pack is used in the last duplication code, with a code of same name function which does not have an argument (step S1610). Furthermore, the information processing apparatus 101 transitions to the process in step S1601.

In a case where the call code is not found (step S1602: No), the information processing apparatus 101 deletes the intermediate language information of the template function and the same name function which does not have an argument (step S1611). After the process in step S1611 ends, the information processing apparatus 101 ends the function parameter pack expansion process.

As described above, in the case where the template function including a variable number of parameters is compiled, the information processing apparatus 101 substitutes the parameter in each process code, in which a process code of the function is duplicated, with a parameter which accepts an actual argument as many as the number of actual arguments which are passed to a variable number of parameters, and sequentially inserts the parameters into the recursive call parts of the function. Therefore, the information processing apparatus 101 is able to suppress preparation of a needless function. Furthermore, in a case where preparation of the needless function is suppressed, it is possible to reduce the codes which become inputs for optimization and it is possible to reduce processing time and a desired memory size for optimization. In addition, since the codes of the function are reduced, the information processing apparatus 101 is able to improve translation performance without performing a needless optimization process.

In addition, the information processing apparatus 101 inserts a process of a function which has the same name as the template function in the source code "src", into the recursive call part of the process code in which the parameter defined based on the unpack operator is substituted with the prepared parameter which accepts an actual argument at the end of the actual-argument list. Therefore, the information processing apparatus 101 is able to perform equivalent optimization on the code which is acquired after the function parameter pack according to the embodiment is expanded, as in a case where the inline optimization is performed on the function which has the same name.

In addition, the information processing apparatus 101 substitutes another parameter in each duplicated process code with each prepared parameter, and substitutes any one of the parameters in each process code with the prepared parameters which accept the respective actual arguments located behind the actual argument accepted by each prepared parameter. Therefore, the information processing apparatus 101 is able to acquire the same processing result as in a case where the instantiation is performed on the respective duplicated processes. More specifically, for example, the duplicated code 911 illustrated in FIG. 9 is the same as the process code in the function 602 illustrated in FIG. 6. Similarly, the duplicated code 912 illustrated in FIG. 9 is the same as the process code in the function 603 illustrated in FIG. 6.

In addition, the source code "src" may include a first function which does not include the parameter and has the same name as the object template function, and a second function which includes one parameter and has the same name as the object template function. Here, the information processing apparatus 101 inserts a process code of one of the first and second functions which is determined depending on the actual argument in the recursive call part of the last substitution code, into the recursive call part of the last substitution code. Therefore, the information processing apparatus 101 is able to insert a process code of an appropriate function even if the number of the actual arguments of the recursive call in the last duplicated code is indefinite and may be one or 0.

Meanwhile, it is possible to realize the compiling method described in the embodiment by causing a computer, such as a personal computer or a work station, to execute a program which is prepared in advance. The compiling program is recorded in a computer-readable recording medium such as a hard disk, a flexible disk, a compact disc-read only memory (CD-ROM), or a digital versatile disk (DVD), and is executed by being read from the recording medium by the computer. In addition, the compiling program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising
a memory; and
a processor coupled to the memory and configured to:
duplicate a process code of a variadic template function that has a variable number of parameters included in a source code, in association with each of actual arguments included in an actual-argument list corresponding to a variadic parameter defined by a variadic operator that packs the variable number of parameters of the variadic template function;
perform a substitution process including substituting, in each of the duplicated process codes, another parameter that is one of parameters of the variadic template function and different from the variadic parameter, with a prepared parameter that is prepared to accept an actual argument, in the actual-argument list, that is associated with the each duplicated process code;
in a case where the another parameter in each process code becomes an actual argument of another function different from the variadic template function, execute a search process of searching for a first function which matches a type of the another parameter or a generation process of generating the first function, based on a template function included in the source code, and substitute a first code for calling the another function with a second code for calling the first function which is acquired through the search process or the generation process; and
perform a function parameter-pack expansion process including:
firstly inserting, into a recursive call part in a process code of the variadic template function, a first one of the duplicated process codes that is associated with an actual argument at a head of the actual-argument list, and
repeating an insertion process of inserting, into a recursive call part in a previously inserted one of the duplicated process codes, a next one of the duplicated process codes associated with an actual argument that is subsequent, in the actual-argument list, to an actual argument associated with the previously inserted one of the duplicated codes.

2. The apparatus of claim 1, wherein
the source code includes a second function that includes no parameters and has a name identical to a name of the variadic template function, and
the processor inserts a process code of the second function into a recursive call part of the duplicated process code associated with the actual argument at an end of the actual-argument list.

3. The apparatus of claim 1, wherein
the substitution process further includes substituting a character string for unpacking the variable number of parameters, included in each of the duplicated process codes, with a sequence of the prepared parameters which respectively accept the actual arguments that are positioned, in the actual-argument list, behind the actual argument associated with the each duplicated process code.

4. The apparatus of claim 3, wherein the source code includes a second function that includes no parameters and has a name identical to a name of the variadic template function, and a third function that includes one parameter and has a name identical to the name of the variadic template function; and the processor inserts, into a recursive call part of the duplicated process code associated with the actual argument at an end of the actual-argument list, a process code of one of the second and third functions that is determined based on an actual argument of the recursive call part.

5. A method comprising:

duplicating a process code of a variadic template function that has a variable number of parameters included in a source code, in association with each of actual arguments included in an actual-argument list corresponding to a variadic parameter defined by a variadic operator that packs the variable number of parameters of the variadic template function;

performing a substitution process including substituting, in each of the duplicated process codes, another parameter that is one of parameters of the variadic template function and different from the variadic parameter, with a prepared parameter that is prepared to accept an actual argument, in the actual-argument list, that is associated with the each duplicated process code;

in a case where the another parameter in each process code becomes an actual argument of another function different from the variadic template function, executing a search process of searching for a first function which matches a type of the another parameter or a generation process of generating the first function, based on a template function included in the source code, and substitute a first code for calling the another function with a second code for calling the first function which is acquired through the search process or the generation process; and performing a function parameter-pack expansion process including:
firstly inserting, into a recursive call part in a process code of the variadic template function, a first one of the duplicated process codes that is associated with an actual argument at a head of the actual-argument list, and
repeating an insertion process of inserting, into a recursive call part in a previously inserted one of the duplicated process codes, a next one of the duplicated process codes associated with an actual argument that is subsequent, in the actual-argument list, to an actual argument associated with the previously inserted one of the duplicated codes.

6. A non-transitory, computer-readable recording medium having stored therein a program causing a computer to perform a process comprising:

duplicating a process code of a variadic template function that has a variable number of parameters included in a source code, in association with each of actual arguments included in an actual-argument list corresponding to a variadic parameter defined by a variadic operator that packs the variable number of parameters of the variadic template function;

performing a substitution process including substituting, in each of the duplicated process codes, another parameter that is one of parameters of the variadic template function and different from the variadic parameter, with a prepared parameter that is prepared to accept an actual argument, in the actual-argument list, that is associated with the each duplicated process code;

in a case where the another parameter in each process code becomes an actual argument of another function different from the variadic template function, executing a search process of searching for a first function which matches a type of the another parameter or a generation process of generating the first function, based on a template function included in the source code, and substitute a first code for calling the another function with a second code for calling the first function which is acquired through the search process or the generation process; and performing a function parameter-pack expansion process including:
firstly inserting, into a recursive call part in a process code of the variadic template function, a first one of the duplicated process codes that is associated with an actual argument at a head of the actual-argument list, and
repeating an insertion process of inserting, into a recursive call part in a previously inserted one of the duplicated process codes, a next one of the duplicated process codes associated with an actual argument that is subsequent, in the actual-argument list, to an actual argument associated with the previously inserted one of the duplicated codes.

* * * * *